United States Patent
Suga et al.

(10) Patent No.: US 9,553,995 B2
(45) Date of Patent: Jan. 24, 2017

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventors: Daisuke Suga, Kawasaki (JP); Michio Fukushima, Yokahama (JP); Eiji Ohara, Kawasaki (JP); Shigeru Koizumi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 14/101,876

(22) Filed: Dec. 10, 2013

(65) Prior Publication Data

US 2014/0169540 A1    Jun. 19, 2014

(30) Foreign Application Priority Data

Dec. 18, 2012 (JP) ................. 2012-276119

(51) Int. Cl.
*H04M 11/00* (2006.01)
*H04M 7/00* (2006.01)

(52) U.S. Cl.
CPC ....... *H04M 7/0024* (2013.01); *H04M 2201/52* (2013.01); *H04M 2203/2066* (2013.01); *H04M 2203/657* (2013.01)

(58) Field of Classification Search
USPC ...................................................... 379/93.01
See application file for complete search history.

(56) References Cited

U.S. PATENT DOCUMENTS

| 5,513,253 | A | | 4/1996 | Yoshida et al. ............... 379/100 |
|---|---|---|---|---|
| 5,519,763 | A | * | 5/1996 | Namekawa ........ H04N 1/00281 |
| | | | | 455/462 |
| 5,649,006 | A | | 7/1997 | Koizumi ....................... 379/373 |
| 5,650,859 | A | | 7/1997 | Koizumi ....................... 358/404 |
| 5,680,449 | A | | 10/1997 | Terajima et al. ............. 379/355 |
| 5,937,069 | A | | 8/1999 | Nagai et al. .................... 380/49 |
| 6,035,205 | A | * | 3/2000 | Han .............................. 455/462 |

(Continued)

FOREIGN PATENT DOCUMENTS

| CN | 101523337 | 9/2009 ............ G06F 3/048 |
|---|---|---|
| JP | 10-126485 A | 5/1998 |

(Continued)

OTHER PUBLICATIONS

Great Britain Search Report issued on May 28, 2014 in connection with GB Application No. 1322172.6.

(Continued)

*Primary Examiner* — Maria El-Zoobi
(74) *Attorney, Agent, or Firm* — Fitzpatrick, Cella, Harper & Scinto

(57) ABSTRACT

An image processing apparatus registers voice call destination information and data transmission destination information for a destination in association with each other. The image processing apparatus executes a voice call with the destination using the voice call destination information, and executes, after the voice call, data transmission to the destination using the data transmission destination information in accordance with a data transmission instruction input by the user.

11 Claims, 14 Drawing Sheets

(56) References Cited

U.S. PATENT DOCUMENTS

| | | | |
|---|---|---|---|
| 6,353,482 B1 | 3/2002 | Abe et al. | 358/1.15 |
| 7,092,113 B1 | 8/2006 | Saito et al. | 358/1.15 |
| 7,139,088 B2 | 11/2006 | Murata et al. | 358/1.15 |
| 7,196,718 B1* | 3/2007 | Barbeau et al. | 348/14.02 |
| 7,564,578 B2 | 7/2009 | Saito et al. | 358/1.15 |
| 7,653,403 B1* | 1/2010 | Liu | 455/500 |
| 7,796,571 B2* | 9/2010 | Kishida | H04W 16/16 370/338 |
| 8,565,202 B2* | 10/2013 | Nagasaki | H04L 41/0803 370/252 |
| 2002/0042264 A1 | 4/2002 | Kim | 455/414 |
| 2002/0161896 A1* | 10/2002 | Wen | H04L 12/1827 709/227 |
| 2006/0072144 A1* | 4/2006 | Dowling | G06F 21/606 358/1.15 |
| 2007/0177194 A1* | 8/2007 | Yamaguchi | H04N 1/0048 358/1.15 |
| 2008/0059627 A1 | 3/2008 | Hamalainen et al. | 709/224 |
| 2009/0154677 A1* | 6/2009 | Kunii | H04M 1/27455 379/142.06 |
| 2011/0237241 A1* | 9/2011 | Nagasaki | H04L 41/0803 455/422.1 |
| 2012/0040644 A1* | 2/2012 | Naik et al. | 455/412.1 |
| 2013/0125234 A1* | 5/2013 | Nishiyama | 726/21 |
| 2014/0087701 A1* | 3/2014 | Tarao | H04W 4/16 455/414.1 |

FOREIGN PATENT DOCUMENTS

| | | | |
|---|---|---|---|
| JP | 10-126845 A | 5/1998 | |
| JP | 2002-330272 A | 11/2002 | |
| JP | 2007-122521 | 5/2007 | G06F 3/048 |
| JP | 2013-128160 | 6/2013 | |
| WO | WO 2012/021529 A1 | 2/2012 | |

OTHER PUBLICATIONS

CN Office Action—Application No. 2013-10693581.7 dated Dec. 29, 2015.
CN Office Action—Application No. 2012-276119 dated Sep. 30, 2016.

* cited by examiner

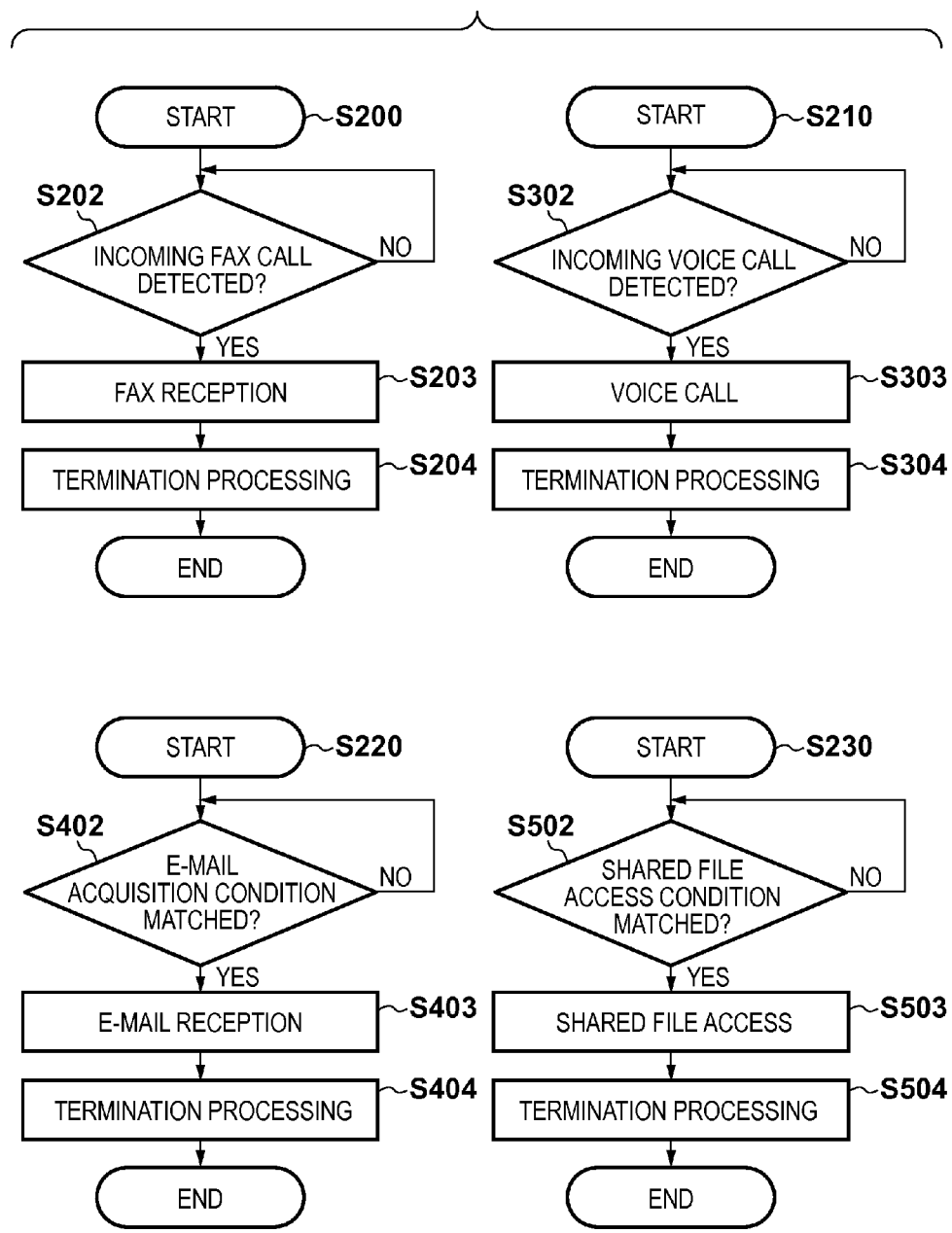

FIG. 5A

```
DESTINATION REGISTRATION                                    ~601
DESTINATION No.=01  NAME=_
VOICE CALL    INTERNET PHONE DESTINATION NAME=
              TEL=

TRANSMISSION  FAX=
              E-MAIL=
              FILE TRANSMISSION=
```

```
DESTINATION REGISTRATION                                    ~602
DESTINATION No.=01  NAME=BRANCH 1
VOICE CALL    INTERNET PHONE DESTINATION NAME=x510**
              TEL=

TRANSMISSION  FAX=03-0000-0001  COMMUNICATION METHOD=T.38
              E-MAIL=
              FILE TRANSMISSION=
```

```
DESTINATION REGISTRATION                                    ~603
DESTINATION No.=01  NAME=BRANCH 1
VOICE CALL    INTERNET PHONE DESTINATION NAME=x510**
              TEL=

TRANSMISSION  FAX=
              E-MAIL=xx@xx.com
              FILE TRANSMISSION=
```

F I G. 5B

DESTINATION REGISTRATION  ~604
DESTINATION No.=01  NAME=BRANCH 1
VOICE CALL     INTERNET PHONE DESTINATION NAME=
               TEL=03-0000-0002

TRANSMISSION  FAX=03-0000-0001  COMMUNICATION METHOD=T.38
              E-MAIL=
              FILE TRANSMISSION=

DESTINATION REGISTRATION  ~605
DESTINATION No.=02  NAME=Taro
VOICE CALL     INTERNET PHONE DESTINATION NAME=x513**
               TEL=

TRANSMISSION  FAX=03-0000-0001  COMMUNICATION METHOD=T.38
              E-MAIL=
              FILE TRANSMISSION= ¥¥172.168.0.1¥smb DESTINATION REGISTRATION  ~606
DESTINATION No.=01  NAME=BRANCH 1
VOICE CALL     INTERNET PHONE DESTINATION NAME=x510**
               TEL=

TRANSMISSION  FAX=
              E-MAIL=
              FILE TRANSMISSION=

DESTINATION REGISTRATION
DESTINATION No.=01  NAME=BRANCH 1
VOICE CALL     INTERNET PHONE DESTINATION NAME=
               TEL=

TRANSMISSION  FAX=
              E-MAIL=xx@xx.com
              FILE TRANSMISSION=

---

608

DESTINATION REGISTRATION
DESTINATION No.=01  NAME=BRANCH 1
VOICE CALL     INTERNET PHONE DESTINATION NAME=x510**
               TEL=03-0000-0002

TRANSMISSION  FAX=03-0000-0001  COMMUNICATION METHOD=T.38
              E-MAIL=xx.@xx.com
              FILE TRANSMISSION=

---

609

DESTINATION REGISTRATION
DESTINATION No.=04   NAME=BRANCH GROUP   GROUP DESTINATION= ○
GROUP BREAKDOWN=05      06      07

FIG. 5D

```
DESTINATION REGISTRATION                                          610
DESTINATION No.=01  NAME=BRANCH 1
VOICE CALL     INTERNET PHONE DESTINATION NAME=
               TEL=03-0000-0004

TRANSMISSION   FAX=03-0000-0003  COMMUNICATION METHOD=T.30
               E-MAIL=
               FILE TRANSMISSION=
```

TRANSMISSION　DESTINATION SELECTION
DESTINATION No.01 BRANCH 1
INTERNET PHONE DESTINATION NAME=x510∗∗
FAX 03-0000-0001　COMMUNICATION METHOD=T.38

| TRANSMISSION AFTER CALLING | TRANSMISSION | CALLING |

702

TRANSMISSION　DESTINATION SELECTION
DESTINATION No.01 BRANCH 1
INTERNET PHONE DESTINATION NAME=x510∗∗
E-MAIL=xx@xx.com

| TRANSMISSION AFTER CALLING | TRANSMISSION | CALLING |

703

TRANSMISSION　DESTINATION SELECTION
DESTINATION No.01 BRANCH 1
TEL=03-0000-0002
FAX=03-0000-0001　COMMUNICATION METHOD=T.38

| TRANSMISSION AFTER CALLING | TRANSMISSION | CALLING |

704

TRANSMISSION　DESTINATION SELECTION
DESTINATION No.02 Taro
INTERNET PHONE DESTINATION NAME=x513∗∗
FILE TRANSMISSION=¥¥172.168.0.1¥smb

| TRANSMISSION AFTER CALLING | TRANSMISSION | CALLING |

TRANSMISSION  DESTINATION SELECTION
DESTINATION No.01 BRANCH 1
CALLING         ☐ INTERNET PHONE DESTINATION NAME=x510**   ☐ TEL=03-0000-0002
TRANSMISSION  ☐ FAX 03-0000-0001
                      COMMUNICATION METHOD=T.38                ☐ E-MAIL=xx@xx.com

| TRANSMISSION AFTER CALLING | TRANSMISSION | CALLING |

706

TRANSMISSION  DESTINATION SELECTION
DESTINATION No.01 BRANCH 1
CALLING         ☑ INTERNET PHONE DESTINATION NAME=x510**   ☐ TEL=03-0000-0002
TRANSMISSION  ☐ FAX 03-0000-0001
                      COMMUNICATION METHOD=T.38                ☑ E-MAIL=xx@xx.com

| TRANSMISSION AFTER CALLING | TRANSMISSION | CALLING |

707

TRANSMISSION  DESTINATION SELECTION
DESTINATION No.01 BRANCH 1
CALLING         ☐ INTERNET PHONE DESTINATION NAME=x510**   ☐ TEL=03-0000-0002
TRANSMISSION  ☐ FAX 03-0000-0001
                      COMMUNICATION METHOD=T.38                ☐ E-MAIL=xx@xx.com

| TRANSMISSION AFTER CALLING | TRANSMISSION | CALLING |

708

TRANSMISSION  DESTINATION SELECTION
DESTINATION No.01 BRANCH 1
CALLING         ☑ INTERNET PHONE DESTINATION NAME=x510**   ☐ TEL=03-0000-0002
TRANSMISSION  ☐ FAX 03-0000-0001
                      COMMUNICATION METHOD=T.38                ☐ E-MAIL=xx@xx.com

| TRANSMISSION AFTER CALLING | TRANSMISSION | CALLING |

TRANSMISSION  DESTINATION SELECTION
DESTINATION No.01 BRANCH 1
CALLING ☑ INTERNET PHONE DESTINATION NAME=x510** ☑ TEL=03-0000-0002
TRANSMISSION ☐ FAX 03-0000-0001
☑ COMMUNICATION METHOD=T.38    ☐ E-MAIL=xx@xx.com

[TRANSMISSION AFTER CALLING] (highlighted)  [TRANSMISSION]  [CALLING] (highlighted)

710

TRANSMISSION  DESTINATION SELECTION
DESTINATION No.01 BRANCH 1
CALLING ☑ INTERNET PHONE DESTINATION NAME=x510** ☐ TEL=03-0000-0002
TRANSMISSION ☐ FAX 03-0000-0001
☑ COMMUNICATION METHOD=T.38    ☑ E-MAIL=xx@xx.com

[TRANSMISSION AFTER CALLING]  [TRANSMISSION]  [CALLING]

711

TRANSMISSION  DESTINATION SELECTION
DESTINATION No.=4   NAME= BRANCH GROUP   GROUP DESTINATION= ○
GROUP BREAKDOWN=05     06     07

[TRANSMISSION AFTER CALLING]  [TRANSMISSION]  [CALLING]

TRANSMISSION DESTINATION SELECTION
DESTINATION No.01 BRANCH 1
INTERNET PHONE DESTINATION NAME=x510**

[TRANSMISSION AFTER CALLING] [TRANSMISSION] [CALLING]

713

TRANSMISSION DESTINATION SELECTION
DESTINATION No.01 BRANCH 1
E-MAIL=xx@xx.com

[TRANSMISSION AFTER CALLING] [TRANSMISSION] [CALLING]

714

TRANSMISSION DESTINATION SELECTION
DESTINATION No.01 BRANCH 1
E-MAIL=xx@xx.com

SELECTED FUNCTION CANNOT BE EXECUTED.

[TRANSMISSION AFTER CALLING] [TRANSMISSION] [CALLING]

715

TRANSMISSION DESTINATION SELECTION
DESTINATION No.01 BRANCH 1
TEL=03-0000-0004
FAX=03-0000-0003  COMMUNICATION METHOD=T.30

[TRANSMISSION AFTER CALLING] [TRANSMISSION] [CALLING]

FIG. 7

| No. | 01 | 02 | 30 | 04 | ... | N |
|---|---|---|---|---|---|---|
| NAME | BRANCH 1 | Taro | BRANCH 2 | BRANCH GROUP | | |
| PRESENCE/ABSENCE OF VOICE CALL DESTINATION | PRESENT | PRESENT | PRESENT | | | |
| INTERNET PHONE DESTINATION NAME | x510** | x513** | x510** | | | |
| PHONE NUMBER | | | 03-0000-0002 | | | |
| ADDITIONAL VOICE CALL DESTINATION | | | | | | |
| PRESENCE/ABSENCE OF COMMUNICATION DESTINATION | PRESENT | PRESENT | PRESENT | | | |
| FAX NUMBER | 03-0000-0001 | | | | | |
| FAX COMMUNICATION METHOD | T.38 | | | | | |
| E-MAIL ADDRESS | | | xx@xx.com | | | |
| FILE TRANSMISSION DESTINATION | | ¥¥172.168.0.1¥smb | | | | |
| ADDITIONAL TRANSMISSION DESTINATION NAME | | | | | | |
| GROUP DESTINATION | | | | ON | | |
| GROUP BREAKDOWN | | | | 05.06.07 | | |

IMAGE PROCESSING APPARATUS, CONTROL METHOD THEREOF, AND STORAGE MEDIUM

BACKGROUND OF THE INVENTION

Field of the Invention

The present invention relates to an image processing apparatus which performs a voice call operation, facsimile communication, e-mail communication, and file transmission via a communication network such as an IP network, a control method thereof, and a storage medium.

Description of the Related Art

Japanese Patent Laid-Open No. 10-126485 discloses a method, which registers a voice call phone number and facsimile (FAX) number for one destination name in a FAX apparatus, and originates a voice call to the voice call phone number when a voice call instruction is input after one destination name is selected. When a transmission instruction is input in the FAX apparatus, FAX data is transmitted to the registered FAX number. Also, a recent MFP (Multi Function Printer) includes a communication unit with an IP network, and has a function of transmitting an e-mail message attached with read image data via the IP network. Also, the MFP has a function of transmitting a file to a shared folder of another PC by SMB (Server Message Block).

In recent years, along with the development of the IP network, an image processing apparatus which can make FAX communications via the high-speed IP network according to the ITU-T (International Telecommunication Union Telecommunication) T.38 recommendation is commercially available. The image processing apparatus compliant with T.38 uses call connection processing called an SIP (Session Initiation Protocol) in a call connection with a communication partner. In an SIP session, an SIP URI (for example, sip:phone number@domain name like sip:0300000001@test.com) described in a header part of an SIP message can designate a communication partner on the call reception side. That is, a communication partner can be designated using a phone number used in a public phone network (to be referred to as a PSTN (Public Switched Telephone Network) hereinafter). Then, in the SIP session, an SDP (Session Description Protocol) indicates a media type of data to be transmitted, and T.38 may use, for example, "still image" (image) and "application" (application). Also, "voice" (voice) can be designated as a media type in a voice call or G3 FAX communication by means of a deemed voice (so called "inband", to be described later). The call originating side transmits an INVITE including an offer SDP, and the call reception side returns a success response including an answer SDP to the call originating side, thus realizing a call connection. In this manner, the SIP instructs a call connection by exchanging IP packets.

Also, a technique for providing services on an NGN (Next Generation Network) network which replaces a conventional line switching type phone line network by a network based on the IP (Internet Protocol) technique has prevailed. The NGN network is an IP network which includes a bandwidth guarantee function and security function in a network itself, and integrally implements a phone service, video communication service, data communication service, and the like using the SIP. As a phone service in Japan, Hikari Denwa is provided. Then, FAX communications using the IP network may be made as the data communication service. Furthermore, along with the development of the IP network, an Internet phone service with which the call originating side and call reception side make peer-to-peer communications via the Internet by packetizing audio data in IP packets is becoming prevalent. Also, Skype™ or the like, which implements an Internet phone function by installing Internet phone software in a PC (Personal Computer) is known. Skype provides a paid voice call service using a conventional phone number in partner designation, but it allows free voice calls between Skype terminals using unique IDs called Skype names in place of the phone number.

However, the related arts suffer the following problems. For example, according to the related art, when a voice call instruction is input after one destination is selected, a voice call is originated to a registered voice call phone number. When a transmission instruction is input, FAX data is transmitted to a registered FAX number. Hence, a voice call or FAX call can be originated without any mistake. However, when FAX data is to be transmitted to the same partner after a voice call, a FAX transmission instruction has to be input again after the voice call is made by inputting a voice call instruction. Therefore, the partner has to be designated twice, resulting in troublesome operations.

Also, when the user wants to execute FAX transmission to the same partner after a voice call, he or she makes the voice call first, and then presses a start button on an MFP after the voice call with the partner to input a transmission instruction, thus attaining FAX transmission to the same phone number, that is, so-called manual transmission in the conventional G3 FAX communications using the PSTN. In some cases, the above sequence is used to prevent wrong partner designation, that is, wrong transmission.

In the following description, of phone services based on the IP technique, a service assigned a phone number (for example, 050-0000-0000) based on the numbering plan will be referred to as an IP phone service, and a service assigned a unique ID (for example, a Skype name) without any assignment of a phone number will be referred to as an Internet phone service. Some image processing apparatuses use a new infrastructure with a low communication cost such as an IP phone service, Internet phone service, Hikari Denwa, or Skype for a voice call, and use the high-speed, secure NGN for FAX transmission. In this case, the manual transmission cannot be used when voice call and FAX phone numbers of the partner are different. Also, since the Internet phone service such as Skype uses a character string such as a Skype name in place of a phone number upon designation of a call partner, the Internet phone destination (Skype name or the like) is different from the FAX transmission phone number.

Also, when the user wants to send an e-mail message after a voice call, a voice call destination and an e-mail address of the partner are different. Furthermore, when the user wants to make file transmission after the voice call, a voice call destination and file transmission destination of the partner are different. Then, the manual transmission cannot be used in a case in which communication units on the transmission side are different respectively for a voice call, FAX transmission, e-mail transmission, and file transmission.

SUMMARY OF THE INVENTION

The present invention enables realization of a mechanism which provides various communication methods, and suitably allows communications with the same partner using different communication methods without requiring partner instruction operations in these communication methods.

One aspect of the present invention provides an image processing apparatus capable of executing a voice call and a data transmission, comprising: a registration unit configured to register voice call destination information used to execute the voice call in association with data transmission destination information used to execute the data transmission for a destination; and a control unit configured to execute a voice call with the destination using the voice call destination information, and to execute, after the voice call, data transmission to the destination using the data transmission destination information in accordance with a data transmission instruction input by a user.

Another aspect of the present invention provides a control method of an image processing apparatus capable of executing a voice call and data transmission, the method comprising: registering voice call destination information used to execute the voice call in association with data transmission destination information used to execute the data transmission for one destination; and executing, in the case that transmission after calling for executing data transmission after a voice call is instructed for the destination, a voice call with the destination using the voice call destination information, and executing data transmission with the destination using the data transmission destination information in accordance with a data transmission instruction input by a user.

Still another aspect of the present invention provides a computer-readable storage medium storing a computer program for controlling a computer to execute respective steps in a control method of an image processing apparatus.

Further features of the present invention will be apparent from the following description of embodiments with reference to the attached drawings.

BRIEF DESCRIPTION OF THE DRAWINGS

FIG. 2 is a control flowchart of a receiving-side MFP according to the present invention;

FIG. 5A shows a user interface screen at a destination registration timing;

FIG. 5B shows a user interface screen at a destination registration timing;

FIG. 5C shows a user interface screen at a destination registration timing;

FIG. 5D shows a user interface screen at a destination registration timing;

FIG. 6A shows a user interface screen at a destination selection timing;

FIG. 6B shows a user interface screen at a destination selection timing;

FIG. 6C shows a user interface screen at a destination selection timing;

FIG. 6D shows a user interface screen at a destination selection timing; and

FIG. 7 is a table showing a registered data structure.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Arrangement of Image Processing Apparatus

Figure 3:
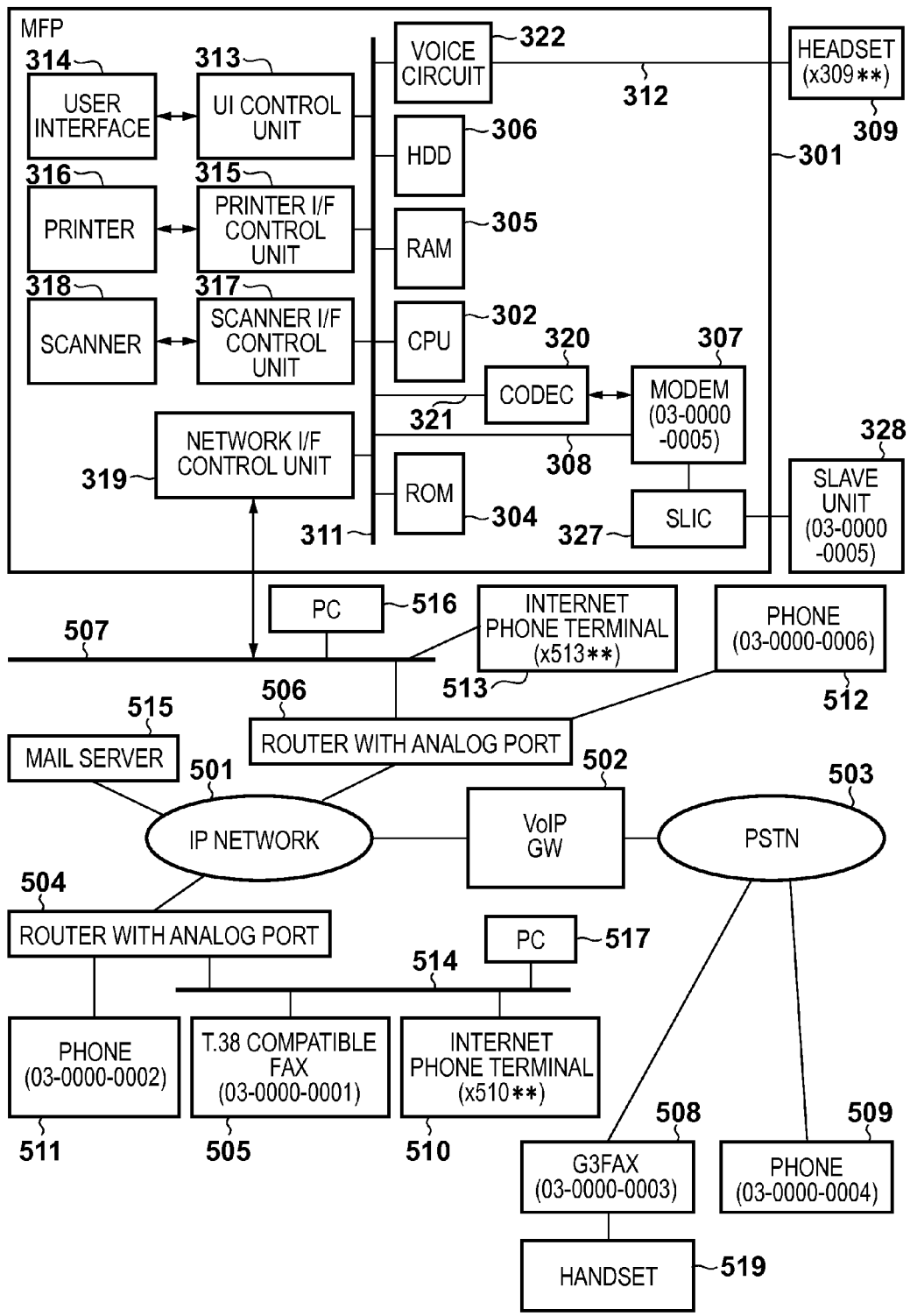
FIG. 3 is a block diagram showing the arrangement of an image processing apparatus and network connections according to the first embodiment.

The first embodiment of the present invention will be described below. The hardware arrangement of an image processing apparatus 301 and network connections according to this embodiment will be described first with reference to FIG. 3. The image processing apparatus 301 is connected to an IP network 501 via a LAN (Local Area Network) 507 and a router 506 with an analog port. As the IP network 501 shown in FIG. 3, a network including the Internet, an NGN, a gateway which interconnects them, and a DNS (Domain Name Server) which attains name solution is assumed. A T.38 compatible FAX 505 having a T.38 compatible FAX function on the receiving side is connected to the IP network 501 via a LAN 514 and a router 504 with an analog port.

The LANs 507 and 514 include hubs and cables which are required to make LAN communications and are connected to each other. To the analog ports of the routers 504 and 506 with the analog ports, PSTN connection phones (public line phones) 511 and 512, which are used to originate and receive calls for a public line, are connected, and can communicate with other phones via the routers. The routers 504 and 506 with the analog ports may be replaced by those without any analog port. In this case, the PSTN connection phones 511 and 512 cannot be used.

A PC 516 has a file sharing function such as an SMB (Server Message Block), and is connected to the LAN 507, thus allowing file sharing within the LAN 507. A mail server 515 is connected to the IP network, and serves as an SMTP (Simple Mail Transfer Protocol) server and POP (Post Office Protocol) server, thus allowing exchange of mail data. A PC 517 is connected to the LAN 514, and is installed with e-mail transmission/reception software, thus allowing transmission/reception of e-mail messages.

Internet phone terminals 510 and 513 are connected to the LANs 514 and 507, and can make communications as Internet phone terminals of Skype or the like. The IP network includes an SIP server (not shown), which executes connection processing of SIP sessions. A VoIP GW (gateway) 502, which executes data exchange processing, is connected between the IP network 501 and a PSTN 503. The PSTN 503 is an existing public phone network. A G3 facsimile apparatus (G3 FAX) 508 is a terminal which supports only T.30 voice calls. A handset 519 is connected to a phone terminal of the G3 FAX 508, and is used to originate or receive a voice call at the time of manual reception or transmission at the G3 FAX 508. A phone 509 is connected to the PSTN 503 and can communicate with other phones.

As described above, the image processing apparatus 301 according to this embodiment can execute a voice call and data transmission. The image processing apparatus 301 has an image input/output function, and performs a paper document input operation and a print output operation on a paper sheet. The image processing apparatus 301 can print input image information on a printing medium such as a paper sheet, can store the information as digital data, and can transfer the information to other devices via a LAN and FAX. The image processing apparatus 301 is always connected to the LAN 507, and it is a common practice to manage that image processing apparatus together with other image processing apparatuses (not shown), PCs (Personal Computers), and servers. The image processing apparatus 301 can receive print data from a PC and image information from another MFP, and can print it out onto a paper sheet. The user can instruct operations of the image processing apparatus 301 via a user interface (to be referred to as "UI" hereinafter) 314.

The internal arrangement of the image processing apparatus 301 will be described below. A CPU 302 loads a control software program of the image processing apparatus 301 from a ROM 304 or HDD 306, expands the loaded program on a RAM 305, and executes the expanded program to systematically control the overall apparatus. The ROM 304 is a read only memory, which stores a boot program, fixed parameters, and the like of the apparatus, and a flash memory is normally used. The RAM 305 is a random access memory, and is used to store temporary work data, image data, and print data when the CPU 302 controls the image processing apparatus 301. The HDD 306 is a hard disk drive, and is used to store various data such as image data, print data, and destination registration information. The RAM 305 and HDD 306 are also used as a work area of the CPU 302 when image processing, encoding/decoding, and resolution conversion of image data are executed.

A UI control unit 313 controls the UI 314, displays various kinds of information, and accepts instruction inputs from the user. A printer I/F control unit 315 is a device which controls a printer 316. A scanner I/F control unit 317 is a device which controls a scanner 318. A network I/F control unit 319 controls data exchange with the LAN 507, and analyzes and generates IP packets of Transmission Control Protocol (TCP), User Datagram Protocol (UDP), Real Time Protocol (RTP), and the like. After an SIP, SDP, VoIP, and data to be transmitted or received upon exchange of IP packets are temporarily stored in the RAM 305 or HDD 306, they are interpreted by the CPU 302, and are processed according to protocol rules. The scanner I/F control unit 317, the CPU 302, the ROM 304, the RAM 305, the HDD 306, a modem 307, the printer I/F control unit 315, the UI control unit 313, and a voice circuit 322 are connected to a bus 311 via electric signals. Also, the network I/F control unit 319 and a CODEC 320 are connected to the bus 311 via electrical signals. The bus 311 is used as a system bus which exchanges control signals from the CPU 302 and data signals between the respective units.

The voice circuit 322 is connected to a headset 309 via an analog signal 312, and A/D or D/A converts a voice and applies signal processing to the voice, so that a voice signal can be handled as PCM data of a G.711 format or another encoded data. The headset 309 incorporates a microphone and loudspeaker, and is used by the user in a voice call since partner's voice data is output from the loudspeaker and a user's voice is input from the microphone. The headset 309 may have a shape like an earphone with a microphone or a handset of a phone. In an Internet phone, voice packet data are exchanged with the IP network 501 via the network I/F control unit 319 and the router 506 with the analog port. Then, the voice packet data are exchanged with the Internet phone terminal 510 of the partner via the router 504 with the analog port on the partner side.

A slave phone (slave unit) 328 is connected to a SLIC (Subscriber Line Interface Circuit) 327 via a PSTN interface. The SLIC 327 controls off-hook detection, DC application, and outputting of a calling signal of the slave phone 328 which is connected to be used in the PSTN. The CPU 302 controls the SLIC 327 to A/D-convert a voice input from a microphone of the slave phone 328, and transmits digital voice data to the CODEC 320 via the modem 307, thus converting the data into PCM data of the G.711 format or another encoded data. The CPU 302 outputs VoIP packets via the network I/F control unit 319. Also, the CPU 302 controls the CODEC 320 to decode PCM data of the G.711 format or other encoded data in VoIP packets fetched via the network I/F control unit 319, and transmits the decoded data to the SLIC 327 via the modem 307. The CPU 302 controls the SLIC 327 to D/A-convert the data, and outputs a voice signal from a loudspeaker of the slave phone 328. The modem 307 and CODEC 320 may be integrated in a single chip.

The image processing apparatus 301 has a T.38 compatible FAX function, and can make FAX communications according to T.38 by connecting a T.38 compatible FAX machine on the partner side via the IP network 501. The user makes an NGN contract with a phone company to be assigned a phone number (03-0000-0005) based on the numbering plan, and assigns the phone number (03-0000-0005) to the image processing apparatus 301 by setting the router 506 with the analog port, thus making communications. The image processing apparatus 301 can make a call connection with a communication partner by SIP.

The data flow upon making a T.38 FAX communication will be described below. The CPU 302 converts scanned image data into encoded data such as JBIG data. The encoded data is converted by the network I/F control unit 319 into a format suited to T.38, and is then transferred to the IP network 501 via the router 506 with the analog port. Then, the T.38 compatible FAX 505 on the partner side receives T.38 IP packets. On the other hand, T.38 IP packets output from the T.38 compatible FAX 505 reach the network I/F control unit 319 via the IP network 501 and router, and encoded digital image data is extracted from the packets and is sent to the CPU 302. The digital image data encoded by, for example, JBIG is decoded to obtain raw image data, and is sent to the printer I/F control unit 315 as received data. Then, that image data is printed by the printer 316.

When a communication partner is incompatible to T.38, the image processing apparatus 301 can make G3 FAX communications by means of a deemed voice (to be also referred to as "T.30 VoIP" hereinafter). In this case, the user makes an NGN contract with a phone company, and makes G3 FAX communications using the same phone number (03-0000-0005) as above and a deemed voice, that is, the modem. Also, the user may make a contract with the phone company to assign a new phone number based on the numbering plan to a deemed voice call. The data flow at that time will be described below.

The CPU 302 converts scanned image data into encoded data such as JBIG data. The CPU 302 controls the modem 307 to modulate the encoded digital image data so as to convert it into a voice signal, and controls the CODEC 320 (voice encoding/decoding unit) to convert the voice signal into digital voice data as PCM data of the G.711 format. As buses 321 and 308, parallel buses or serial buses such as SPI or I2C are used. Then, the CPU 302 controls the network I/F control unit 319 to convert the digital voice data into VoIP packets, and transfers these packets to the IP packet 501 via the router 506 with the analog port. The VoIP packets follow an RTP (Real Time Protocol) format. The VoIP GW 502, which executes data exchange processing, is connected between the IP network 501 and PSTN 503. The VoIP GW 502 converts the VoIP packets into a format that can be transmitted through the PSTN 503, and the deemed voice reaches the G3 FAX 508 of the partner machine via the PSTN 503. A voice signal output from the G3 FAX 508 is converted into VoIP packets by the VoIP GW 502 via the PSTN 503, and these packets reach the network I/F control unit 319 via the IP network 501 and the router with the analog port. The VoIP packets are sent from the bus 311 to the CPU 302, and are then sent to the CODEC 320 via the bus 321 to be converted from PCM data of the G.711 format into a voice signal. The voice signal is sent to and is demodulated by the modem 307, and encoded digital image data is extracted from the decoded data, and is sent to the CPU 302. The digital image data encoded by, for example, JBIG is decoded into raw image data, and is sent to the printer I/F control unit 315 as received data. Then, the image data is printed by the printer 316.

Using the slave phone 328 connected to the image processing apparatus 301, the user can make a voice call with the partner's Internet phone terminal or phone via the IP network 501. In this case, the same phone number (03-0000-0005) as that for the deemed voice is also used for the slave phone 328. That is, the FAX communication modem and slave phone use the same phone number. Also, the user may make a contract with the phone company to assign a new phone number based on the numbering plan to a voice call of the slave phone.

The image processing apparatus 301 is installed with Internet phone software such as Skype, and also serves as an Internet phone terminal having an Internet phone destination name (x309**). When a voice call is made using the Internet phone function of the image processing apparatus 301, the headset 309 connected to the voice circuit 322 is used. In this manner, the image processing apparatus 301 allows the user to make a voice call with a partner's Internet phone terminal or phone via the IP network 501 using the headset 309.

In this manner, the image processing apparatus 301 can make FAX communications based on T.38 with the T.38 compatible FAX 505 via the IP network 501. The image processing apparatus 301 can make FAX communication by means of a deemed voice (to be also referred to as "T.30 VoIP" hereinafter) with the G3 FAX 508 via the IP network 501, VoIP GW 502, and PSTN 503. The image processing apparatus 301 allows the user to make a voice call with the Internet phone terminal 510 via the IP network 501. At this time, the headset 309 can be used for a voice call. The image processing apparatus 301 can transmit an e-mail message to a mail server via the IP network 501. Furthermore, the image processing apparatus 301 allows the user to make a voice call with the phone 511 via the IP network 501. At this time, the slave phone 328 can be used for a voice call. The image processing apparatus 301 can transmit a file to the PC 516 via the LAN 507. Moreover, the image processing apparatus 301 allows the user to make a voice call with the Internet phone terminal 513 via the LAN 507.

Assume that the user correctly knows a voice call phone number, Internet phone destination name, FAX number, e-mail address, a path name to a shared folder, and the like of the partner. Also, assume that when the image processing apparatus 301 executes FAX transmission, the user selects in advance either T.38 or T.30 VoIP to be used to establish a connection. Alternatively, the image processing apparatus 301 may automatically discriminate and select one of T.38 and T.30 VoIP according to a partner's performance.

<Processing Sequence on Transmitting Side>

The processing sequence of the image processing apparatus 301 as the transmitting side in communications will be described below with reference to FIGS. 1A and 1B. The processing to be described below is implemented when the CPU 302 reads out a control program stored in the ROM 304 or HDD 306 onto the RAM 305, and executes the readout program.

Assume that the image processing apparatus 301 is in a standby state, and the user is ready to make an arbitrary operation. The CPU 302 of the image processing apparatus 301 determines in step S101 whether or not the user selects start of destination registration of a phone book. If the user instructs to start destination registration via the UI 314, the CPU 302 advances to the process of step S102. If the user does not instruct to start destination registration via the UI 314, the CPU 302 advances to the process of step S103. The start instruction of destination registration of the phone book may be issued from software on the PC 516 connected via the LAN 507 to the image processing apparatus 301 in place of the UI 314. In this case, the CPU 302 determines based on information received from the PC 516 via the network I/F control unit 319 whether or not the user selects start of destination registration.

In step S102, the CPU 302 registers a partner's voice call destination name (voice call destination) and transmission destination name (data transmission destination) in association with each other in the phone book of the image processing apparatus 301 according to user operations input via the UI 314. Registration in the phone book may be attained by downloading software or phone book data on the PC 516 connected via the LAN 507 to the image processing apparatus 301 in place of the UI 314.

Practical screens of the UI 314 in the registration method using the UI 314 will be described below with reference to FIGS. 5A to 5C (screens 601 to 608).

When the user inputs a destination registration instruction on the UI 314, and selects a destination No. (No. is "Number"), a screen 601 is displayed. On the screen 601, the user can set "destination No. 01". The user inputs a name via the UI 314. The user can use a touch panel of the UI 314 or a keyboard or speech recognition input function (not shown) so as to make various inputs via the UI 314. As the name to be input, an appropriate name which is obvious for the user to distinguish a partner can be freely input using 64 characters or less. In this case, the user sets "branch 1" as a destination name.

Also, the user inputs an Internet phone destination name (voice call destination) of a voice call partner via the UI 314 on the screen 601. In this case, the user sets "x510**" as the Internet phone destination name. In this manner, the Internet phone destination name is a string including characters and numerals. As this Internet phone destination name, the user inputs an appropriate destination name used in the Internet phone software installed in the image processing apparatus 301. For example, in case of Skype, the user inputs a unique Skype name determined by six to 32 characters starting with a one-byte character. Furthermore, the user inputs a FAX phone number (data transmission destination) of a FAX transmission partner via the UI 314 on the screen 601. In this case, the user sets "03-0000-0001" as the FAX phone number. When the user wants to transmit data by T.38 via the NGN, he or she selects and sets T.38 as a communication method as an option setting. Thus, inputs of settings of T.38 FAX transmission after a voice call using the Internet phone is complete.

A screen 602 is displayed on the UI 314. Alternatively, when the image processing apparatus 301 is to automatically discriminate one of T.38 and T.30 VoIP according to a partner's performance upon execution of FAX transmission, the user may not set a communication method field while leaving it as a blank. The user confirms the contents of the screen 602, and inputs registration instruction via the UI 314 when he or she confirms that the settings are correct. Then, information set in "destination No. 1" is registered to associate the destination instructed in the voice call field with that instructed in the transmission field, thus completing settings of transmission after calling. Note that "transmission after calling" means that the image processing apparatus 301 executes data transmission to a predetermined partner after execution of a voice call. Also, on the destination registration screen 601, the CPU 302 may hide a destination associated with a function which is not available at this time on the UI 314 so as not to be selected.

FIG. 7 shows an example of a registered data structure of the phone book. Registered data of the phone book is converted into character codes and numeric data which can be handled by the CPU 302, and is stored in the HDD 306 in the image processing apparatus 301. The registered data of the phone book stored in the HDD 306 is not erased even after power OFF, and is loaded and can be used again every time the image processing apparatus 301 is activated. Alternatively, destination registration information may be stored in a nonvolatile memory such as a flash memory or memory card (not shown) or a battery backed-up SRAM in the image processing apparatus 301. Alternatively, destination registration information may be stored in another server or PC (not shown) via the LAN 507. The registered data structure of the phone book includes No., a name, the presence/absence of a voice call destination, an Internet phone destination name, a phone number, an additional voice call destination name, the presence/absence of a transmission destination, a FAX number, a FAX communication method, an e-mail address, a file transmission destination, and an additional transmission destination name. The additional voice call destination name and additional transmission destination name are expansion data fields when a new communication option is added in the future. A group destination and group breakdown are used when the same processing is simultaneously executed for a plurality of destination names, as will be described later. The presence/absence of a voice call destination is set as "present" when one of the Internet phone destination name, phone number, and additional voice call destination name is registered. The presence/absence of a transmission destination is set as "present" when one of the FAX number, e-mail address, file transmission destination, and additional transmission destination name is registered.

A screen 603 shows e-mail transmission settings after a voice call to an Internet phone. On the screen 603, "branch 1" is set as a destination name. The user sets an Internet phone destination name "x510**" of a voice call partner. The user inputs an e-mail address of a transmission partner. In this case, the user inputs "xx@xx.com". Other fields may be blank. Upon completion of input of settings, the screen 603 is displayed on the UI 314.

A screen 604 shows FAX transmission settings after a voice call to an Internet phone. On this screen, "branch 1" is set as a destination name. The user sets a phone number "03-0000-0002" of a voice call partner. The user sets a FAX number "03-0000-0001" of a transmission partner. The communication unit sets a communication method "T.38". Other fields may be blank. Upon completion of inputs of settings, the screen 604 is displayed on the UI 314.

A screen 605 shows file transmission settings after a voice call to an Internet phone. On this screen, "destination No. 02" is set. Also, on this screen, "Taro" is set in a destination name. The user sets an Internet phone destination name "x513**" of a voice call partner. The user sets a location of a shared folder (path name to the shared folder) "¥¥172.168.0.1¥smb" of a transmission partner. An ID and password required for an access may be set at the same time if they are available. Other fields may be blank. Upon completion of input of settings, the screen 605 is displayed on the UI 314.

A screen 606 shows voice call settings to an Internet phone. On this screen, "destination No. 01" is set. Also, on this screen, "branch 1" is set in a destination name. The user sets an Internet phone destination name "x510**" of a voice call partner. Other fields may be blank. Upon completion of input of settings, the screen 606 is displayed on the UI 314.

A screen 607 shows transmission settings to e-mail. On this screen, "branch 1" is set in a destination name. The user inputs an e-mail address of a transmission partner. In this case, the user inputs "xx@xx.com". Other fields may be blank. Upon completion of input of settings, the screen 607 is displayed on the UI 314.

A screen 608 shows settings of a plurality of voice call destinations (voice call destinations) and transmission destinations (data transmission destinations). On this screen, "branch 1" is set in a destination name. The user sets an Internet phone destination name "x510**" and phone number "03-0000-0002" of a voice call partner. The user sets an e-mail address "xx@xx.com" and FAX number "03-0000-0001" of a transmission partner. Also, the FAX communication unit sets a FAX communication method "T.38". Other fields may be blank. Upon completion of input of settings, the screen 608 is displayed on the UI 314.

Figure 1A:
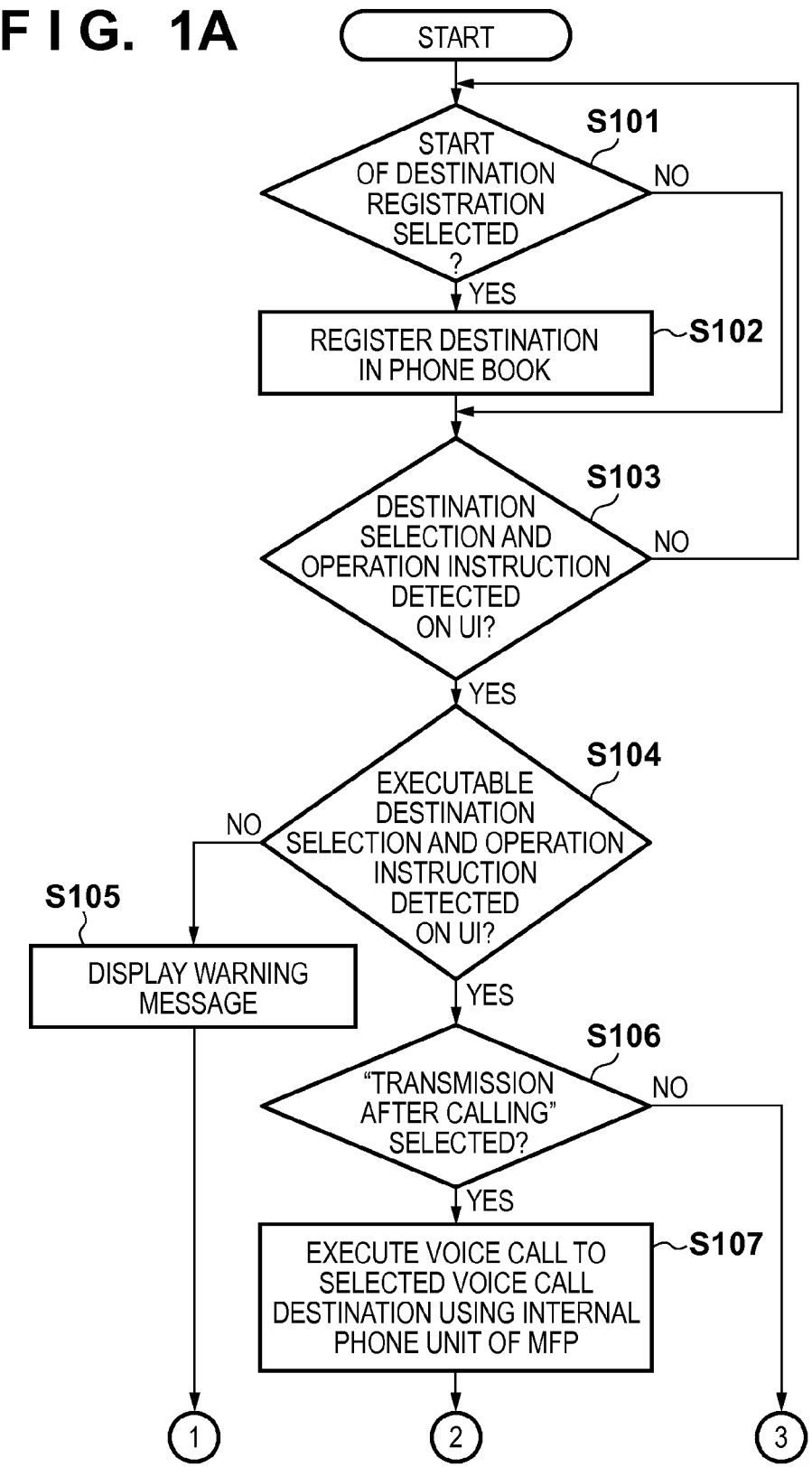
FIGS. 1A and 1B are a control flowchart of a transmitting-side MFP according to the present invention.
Figure 1B:
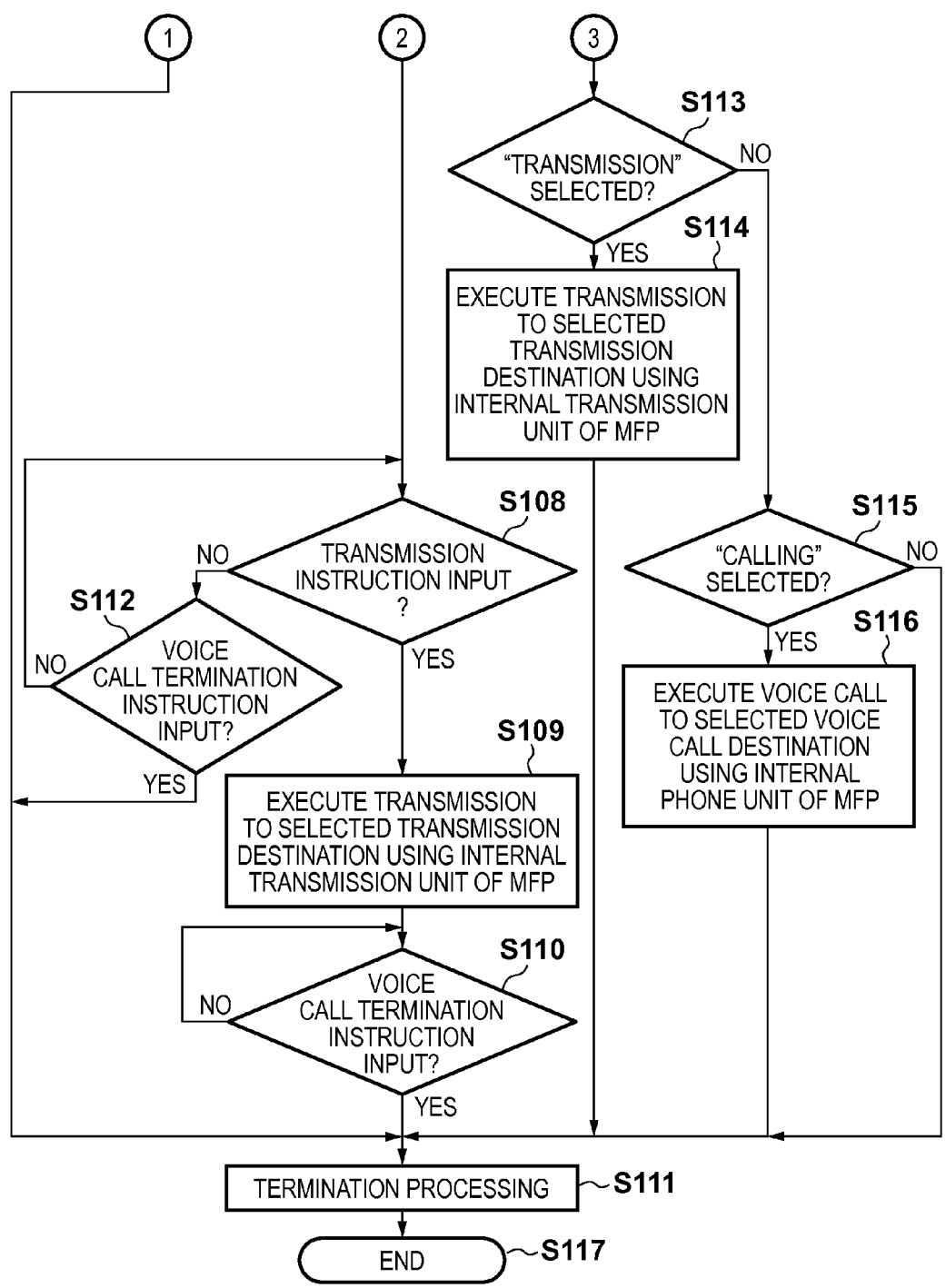

The description will revert to that of the flowchart shown in FIGS. 1A and 1B. Upon completion of destination registration of the phone book in step S102, the CPU 302 advances the process to step S103. The CPU 302 determines in step S103 whether or not the user makes destination selection and inputs an operation instruction on the UI 314. If the user neither makes any destination selection nor inputs any operation instruction, the process of the CPU 302 returns to step S101. The user stacks documents to be transmitted on the scanner of the image processing apparatus 301, selects a transmission menu using the UI 314, and selects a destination No. of a partner of transmission after calling. Normally, the scanner includes an automatic document feeder, and can sequentially read a plurality of documents once they are set. In this case, the user inputs instruction of a resolution, document size, monochrome or color, reading image quality mode, and double/single-sided upon reading a document. Also, the user may set only required reading mode-related items in association with destination registration information at the destination registration timing.

If the user sets in step S102 that T.38 FAX transmission is executed after a voice call to the Internet phone, as shown in the screen 602, the CPU 302 displays a screen 701 shown in FIG. 6A on the UI 314. This screen 701 basically displays the registered destinations. On the screen 701, the CPU 302 hides a destination field associated with a function, if a destination of the function is not registered, on the UI 314. Alternatively, the CPU 302 may display TEL fields and the like as blank fields.

After the user confirms if the voice call destination and FAX transmission destination are correct, he or she instructs "transmission after calling" on the UI 314. Also, when the user wants to make a voice call alone, he or she instructs "calling" on the UI 314; when the user wants to make transmission alone, he or she instructs "transmission" on the UI 314. The user inputs the instruction by pressing the touch panel or given key on the UI 314. Then, the instruction is transferred from the UI control unit 313 to the CPU 302, and since the CPU 302 detects that the user selects the destination and inputs the operation instruction on the UI 314, it advances the process to step S104.

If the user sets in step S102 that e-mail transmission is executed after a voice call to the Internet phone, as shown in the screen 603, a screen 702 shown in FIG. 6A is displayed on the UI 314. After the user confirms if the voice call destination and e-mail destination are correct, he or she instructs one of "transmission after calling", "transmission", and "calling" on the UI 314. Then, the process of the CPU 302 advances to step S104.

If the user sets in step S102 that T.38 FAX transmission is executed after a voice call to the phone, as shown in the screen 604, a screen 703 shown in FIG. 6A is displayed on the UI 314. After the user confirms if the voice call destination and e-mail destination are correct, he or she instructs one of "transmission after calling", "transmission", and "calling" on the UI 314. Then, the process of the CPU 302 advances to step S104.

If the user sets in step S102 that file transmission is executed after a voice call to the Internet phone, as shown in the screen 605, a screen 704 shown in FIG. 6A is displayed on the UI 314. After the user confirms if the Internet phone destination name and file transmission destination are correct, he or she instructs one of "transmission after calling", "transmission", and "calling" on the UI 314. Then, the process of the CPU 302 advances to step S104.

If the user sets in step S102 that a voice call is made to the Internet phone, as shown in the screen 606, a screen 712 shown in FIG. 6D is displayed on the UI 314. After the user confirms if the Internet phone destination name is correct, he or she instructs "calling" on the UI 314. In this case, since only the voice call destination is registered in "destination No. 1", the "transmission after calling" and "transmission" instructions (buttons) are grayed out to inform the user that these functions cannot be executed. Alternatively, these instructions are hidden. Then, the process of the CPU 302 advances to step S104.

If the user sets in step S102 that e-mail transmission is executed, as shown in the screen 607, a screen 713 shown in FIG. 6D is displayed on the UI 314. After the user confirms if the e-mail address is correct, he or she instructs "transmission" on the UI 314. In this case, since only the transmission destination is registered in "destination No. 1", the "transmission after calling" and "calling" instructions are grayed out to inform the user that these functions cannot be executed. Alternatively, these instructions are hidden. Then, the process of the CPU 302 advances to step S104.

If the user sets a plurality of voice call destinations and transmission destinations shown on the screen 608 in step S102, a screen 705 shown in FIG. 6B is displayed on the UI 314. The user has to select a voice call partner from the plurality of voice call destinations, and a transmission destination from the plurality of transmission destination. Before the user selects the destinations, the CPU 302 cannot determine which of the functions "transmission after calling", "transmission", and "calling" is to be executed. For this reason, the CPU 302 grays out the "transmission after calling", "transmission", and "calling" instructions on the UI 314 to inform the user that these functions cannot be executed before he or she selects the destinations. Alternatively, these functions are hidden. If there are items which cannot fall within the screen of the UI 314, they can be displayed by scrolling the screen. If the user selects the Internet phone destination name as the voice call destination and the e-mail as the transmission destination, symbols are displayed in check boxes on the screen of the UI 314, as shown in the screen 706, and the "transmission after calling", "transmission", and "calling" instructions are displayed to be selectable. After the user confirms if the Internet phone destination name of the voice call partner and the e-mail address of the transmission partner are correct, he or she instructs one of "transmission after calling", "transmission", and "calling" on the UI 314. Then, the process of the CPU 302 advances to step S104.

If the user selects "e-mail" as the transmission destination on the UI 314 while the screen 705 is displayed on the UI 314, a symbol is displayed in a check box on the screen of the UI 314, as shown in a screen 707, and the "transmission" instruction is displayed to be selectable. Since the voice call destination is not selected, the "transmission after calling" and "calling" instructions are grayed out to inform the user that these functions cannot be executed. Alternatively, these functions are hidden. After the user confirms if the e-mail address of the transmission partner is correct, he or she instructs "transmission" on the UI 314. Then, the process of the CPU 302 advances to step S104.

If the user selects "Internet phone destination name" as the voice call destination on the UI 314 while the screen 705 is displayed on the UI 314, a symbol is displayed in a check box on the screen of the UI 314, as shown in a screen 708. Since the transmission destination is not selected, the "transmission after calling" and "transmission" instructions are grayed out to inform the user that these functions cannot be executed. Alternatively, these functions are hidden. After the user confirms if the Internet phone destination name of the voice call partner is correct, he or she instructs "calling" on the UI 314. Then, the process of the CPU 302 advances to step S104.

If the user selects "Internet phone destination name" and "phone destination" as the voice call destinations and "FAX" as the transmission destination on the UI 314 while the screen 705 is displayed on the UI 314, symbols are displayed in check boxes on the screen of the UI 314, as shown in a screen 709. In this case, the user makes a voice call to the phone using the slave phone 328 while making a voice call to the Internet phone using the headset 309, and it is impossible for a single user to simultaneously make voice calls to the two destinations. Hence, only "transmission" is displayed. The "transmission after calling" and "calling" instructions are grayed out to inform the user that these functions cannot be executed. Alternatively, these instructions are hidden. When the user wants to execute transmission, he or she confirms if the FAX destination name is correct, and then instructs "transmission" on the UI 314. Then, the process of the CPU 302 advances to step S104.

If the user selects "Internet phone destination name" as the voice call destination and "FAX" and "e-mail" as the transmission destinations on the UI 314 while the screen 705 is displayed on the UI 314, symbols are displayed in check boxes on the screen of the UI 314, as shown in a screen 710. Since data can be sequentially or simultaneously transmitted to the two destinations, that is, the FAX and e-mail destinations after a voice call to the phone, "transmission after calling", "transmission", and "calling" are displayed to be selectable. When the user wants to execute transmission after calling, after he or she confirms if the Internet phone destination name of the voice call partner, the FAX destination name, and e-mail address are correct, he or she instructs "transmission after calling" on the UI 314. Then, the process of the CPU 302 advances to step S104.

The processing for displaying "transmission after calling" and "calling" as long as the destinations are registered even when the user does not input any use instruction to a voice call unit such as the headset 309 or slave phone 328 has been described. Alternatively, another processing may be executed. That is, even when the destinations are registered, "transmission after calling" and "calling" may be grayed out or hidden before the user inputs the use instruction of the headset 309 or slave phone 328. Then, after the CPU 302 detects that the user inputs the use instruction of the headset 309 or slave phone 328, "transmission after calling" and "calling" may be displayed.

The CPU 302 determines in step S104 whether or not the user has made the executable destination selection and operation instruction on the UI. If the user has attempted to input the grayed-out instruction on the UI 314 of any of the operation instructions "transmission after calling", "transmission", and "calling" in step S103, the CPU 302 cannot execute an operation instructed by the user, and the process advances to step S105. On the other hand, if the user has input the instruction which is normally displayed on the UI 314 and is executable of any of the operation instructions "transmission after calling", "transmission", and "calling" in step S103, the CPU 302 advances to the process of step S106. Note that when the instruction is grayed out on the UI 314 so as not to be selected, the determination process of step S104 and the process of step S105 may be omitted.

The detailed determination method of step S104 will be described below. When the CPU 302 executes initialization processing after power-ON of the image processing apparatus 301, it accesses hardware components or software modules which implement various functions that can be added to the image processing apparatus 301 and confirms if they do not fail. In this case, the CPU 302 stores available functions in the RAM 305. When the user instructs a destination No. from the transmission menu, the CPU 302 reads out the registered data structure of the phone book from the HDD 306, compares the available functions and the registered destinations, and displays only matched functions on the UI 314 in step S103. More specifically, when an Internet phone destination name of registered data of the destination No. displayed by the user is registered, if the Internet phone function is available, the CPU 302 determines that the voice call function by means of the Internet phone can be executed. When a phone number is registered, if a phone function is available, the CPU 302 determines that the voice call function by means of the phone can be executed. Also, when an additional voice call destination name is registered, if an additional voice call function is available, the CPU 302 determines that the voice call function by means of the additional function can be executed. The additional voice call function is an auxiliary function required to support a communication function which may be expanded in the future. When a FAX number of registered data of the destination No. selected by the user is registered, if a FAX function is available, the CPU 302 determines that the FAX transmission function can be executed. When an e-mail address is registered, if an e-mail transmission function is available, the CPU 302 determines that the e-mail transmission function can be executed. When a file transmission destination is registered, if a file transmission function is available, the CPU 302 determines that the file transmission function can be executed. When an additional transmission destination name is registered, if an additional transmission function is available, the CPU 302 determines that the additional transmission function can be executed. The additional transmission function is an auxiliary function required to support a communication function which may be expanded in the future.

On the screen 601 for the destination registration, the CPU 302 may hide destinations associated with unavailable functions at this time on the UI 314.

According to the NGN contract, the user can simultaneously establish a plurality of communication sessions with respect to a single phone number, and can simultaneously communicate with a plurality of partners via the IP network. More specifically, the user makes the NGN contract with the phone company, is assigned one phone number (03-0000-0005) based on the numbering plan, and assigns the phone number "03-0000-0005" to the image processing apparatus 301 to make communications. By making a multi-session contract, the user assigns the first session to a data communication of a T.38 FAX communication, assigns the second session to a voice call of the slave phone 328, and can simultaneously communicate. In this case, the user makes the contract that one phone number is assigned, and the number of sessions is two. However, only one of a T.30 VoIP communication (IP phone: Internet Protocol phone) by means of a deemed voice using the modem 307 and a voice call using the slave phone 328 can be selected. This is a hardware limitation. When the user instructs a FAX number as the transmission destination, and instructs a T.30 VoIP communication by means of a deemed voice using the modem 307 as a voice call unit, if he or she inputs a use instruction of the slave phone 328 as a voice call unit, these functions cannot be simultaneously executed. In this case, the process of the CPU 302 advances to step S105. In this manner, the CPU 302 determines whether or not the user has input the executable instruction.

In step S105, since the instruction accepted from the user cannot be executed, the CPU 302 displays a warning message "selected function cannot be executed" shown in a screen 714 of FIG. 6D on the UI 314. For example, when the user selects grayed-out "transmission after calling" or "calling" while the screen 713 is displayed on the UI 314, since no voice call destination is registered, the selected function cannot be executed, and the screen 714 is displayed on the UI 314. The display content of the warning message may be changed according to the selected function. For example, when no voice call destination is registered, if the user selects "transmission after calling" or "calling", a message "execute after registration of voice call destination" may be displayed. When no transmission destination is registered, if the user selects "transmission after calling" or "transmission", a message "execute after registration of transmission destination" may be displayed. After that, the CPU 302 advances to the process of step S111.

On the other hand, the CPU 302 determines in step S106 whether or not the user has selected "transmission after calling". If the user has instructed "transmission after calling" on the UI 314, the CPU 302 advances to the process of step S107. On the other hand, if the user has not instructed "transmission after calling" on the UI 314, the CPU 302 advances to the process of step S113.

In step S107, the CPU 302 executes a voice call operation using an internal phone unit of the image processing apparatus 301 to the selected voice call destination name. A case will be explained below wherein the user has instructed "transmission after calling" shown in the screen 701, 702, 704, 706, or 710 on the UI 314 in step S103. In this case, since the Internet phone destination name=x510 is registered, the CPU 302 executes Internet phone software (phone unit) installed in the image processing apparatus 301** to allow the user to make a voice call with the corresponding Internet phone destination name. The Internet phone software executes connection processing with a partner's Internet phone via the network I/F control unit 319. When the voice call partner answers a call of the Internet phone, the user can make a voice call with the partner using the headset 309. The user confirms if the partner is a correct voice call partner, and the transmission destination is correct. Then, the CPU 302 advances to the process of step S108.

A case will be described below wherein the user has instructed "transmission after calling" shown in the screen 703 on the UI 314 in step S103. In this case, since the partner's phone number TEL=03-0000-0002 is registered, the CPU 302 executes a voice call to the partner's phone number using the Internet phone or a phone unit based on the NGN voice contract. If the user operates the headset 309 and inputs a use instruction, or if he or she inputs a voice call instruction from the Internet phone on the UI 314, the CPU 302 executes a voice call operation to the partner's phone number (03-0000-0002) using the Internet phone. If the user off-hooks the slave phone 328 and inputs a use instruction, or if he or she inputs a voice call instruction using the slave phone on the UI 314, the CPU 302 executes a voice call operation to the partner's phone number (03-0000-0002) using the phone unit based on the NGN voice contract. If the user has not input any use instruction of the headset 309 or slave phone 328 after he or she instructed "transmission after calling", the CPU 302 displays a message "set headset in use start state or off-hook slave phone" on the UI 314. If the user has input the use instruction of the headset 309 or slave phone 328 before he or she instructs "transmission after calling", the CPU 302 does not display that message. A use start instruction of the headset 309 can also be input using the voice circuit 322. A use start instruction of the slave phone 328 can also be input by detecting an off-hook operation by the SLIC 327.

The processing of the partner-side apparatus will be described below with reference to a flowchart 210 shown in FIG. 2. Note that the partner side includes various devices connected to the IP network and PSTN 503 shown in FIG. 3, that is, external apparatuses which can communicate with the image processing apparatus 301. Assume that a voice call unit on the partner side is in a standby state. In step S302, the partner-side apparatus stands by until an incoming voice call is detected. For example, if a wrong voice call destination is registered, a correct partner does not answer. If the incoming voice call is detected, the process advances to step S303. In step S303, the partner-side apparatus allows the partner to make a voice call with the user. The partner-side apparatus confirms if the user is a correct partner and a transmission destination is correct via the voice call with the user. If the partner-side apparatus executes a voice call termination operation or the user executes a voice call termination operation in step S304, the voice call unit on the partner side executes voice call termination processing via the IP network or PSTN. After that, the voice call unit of the partner-side apparatus returns to a standby state, thus ending the series of processes.

The description will revert to that of the flowchart shown in FIGS. 1A and 1B. The CPU 302 determines in step S108 whether or not the transmission instruction is input. In step S107, when the user makes a voice call with the partner side, and determines that no problem is posed if transmission is executed, he or she inputs the transmission instruction by pressing a start key or the like on the UI 314. In this manner, upon reception of an event such as pressing of a predetermined key or the like, the CPU 302 detects that the transmission instruction is input on the UI 314, and the process advances to step S109. In step S107, when the user makes a voice call with the partner side, and determines that a problem is posed if transmission is executed, he or she need not perform any transmission instruction operation such as pressing of a start key or the like on the UI 314. Alternatively, the user may input transmission stop and voice call termination instructions by pressing a stop key or the like. If the CPU 302 cannot detect any transmission instruction on the UI 314, the process advances to step S112.

The CPU 302 determines in step S112 whether or not a voice call termination instruction is input. When the user makes a voice call with the partner side, and determines that a problem is posed if transmission is executed, he or she inputs a voice call termination instruction using the headset 309 or slave phone 328 used in the voice call or the UI 314. Also, when the partner does not answer a voice call, the user can input a voice call termination instruction. The voice call termination instruction of the slave phone 328 can be input by detecting an on-hook operation by the SLIC 327. When the CPU 302 detects a voice call termination instruction, the process advances to termination processing of step S111. Also, when a user instruction cannot be detected within a predetermined period of time, which is set in advance, the CPU 302 determines detection of a voice call termination instruction, and the process advances to step S111. On the other hand, if a voice call termination instruction cannot be detected, the CPU 302 returns to the process of step S108.

In step S109, the CPU 302 executes transmission to the selected transmission destination using an internal transmission unit of the MFP. A case will be explained below wherein the user instructs "transmission after calling" on the screen 701, 703, or 710 via the UI 314 in step S103. In this case, since "FAX=03-0000-0001" and "communication unit=T.38" are registered, the CPU 302 executes transmission to the corresponding FAX number. When a receiving apparatus answers a call, the CPU 302 reads documents set on the scanner 318 in a designated mode, and transmits read image data in a communication method which matches T.38. In this case, the CPU 302 may execute direct transmission for executing FAX transmission while reading documents. Alternatively, immediately after the user selects "transmission after calling", the CPU 302 may read all documents in advance, may store image data in the HDD 306, and may execute memory transmission using the stored image data upon execution of FAX transmission. That is, documents can be read by the scanner 318 at an arbitrary timing.

The CPU 302 generates an SIP URI based on the instructed partner's FAX number, and starts an SIP call connection. The image processing apparatus 301 transmits an INVITE message to the T.38 compatible FAX 505. Upon reception of the INVITE message, the T.38 compatible FAX 505 scans an offer SDP included in the INVITE message. If the offer SDP describes compatible media information, the T.38 compatible FAX 505 transmits a 200 OK message. The 200 OK message includes an SDP which describes media information acceptable by the T.38 compatible FAX 505 and a reception port number. Upon reception of the 200 OK message, the CPU 302 transmits an ACK message indicating reception of the 200 OK message. Thus, an SIP session which implements a data communication based on the media information agreed by both the apparatuses is established between the image processing apparatus 301 and T.38 compatible FAX 505. The CPU 302 establishes media to be transmitted by the SIP session as T.38, and then exchanges image data between the image processing apparatus 301 and T.38 compatible FAX 505. Upon completion of transmission of image data from the image processing apparatus 301, the image processing apparatus 301 transmits a BYE message indicating the termination of the session. When the T.38 compatible FAX 505 receives the BYE message, and does not require any communication after completion of data reception, it transmits a 200 OK message, and both the image processing apparatus 301 and T.38 compatible FAX 505 disconnect the call. Then, the CPU 302 advances to the process of step S110.

On the other hand, when "FAX=03-0000-0003" and "communication unit=T.30 VoIP" are registered as the transmission destination, the CPU 302 executes G3 FAX transmission using a deemed voice to the corresponding FAX number using the modem 307. After the CPU 302 establishes a session to have a media type="audio", it exchanges VoIP data between the image processing apparatus 301 and VoIP GW 502. Then, the VoIP GW 502 converts the VoIP data, and a deemed voice signal is transferred to the G3 FAX 508 via the PSTN 503. Then, a FAX communication is made between the image processing apparatus 301 and G3 FAX 508 according to the T.30 procedures. When the FAX transmission from the image processing apparatus 301 terminates, it outputs DCN (Disconnect) of the T.30 procedures, and the G3 FAX 508 disconnects the call. The image processing apparatus 301 transmits a BYE message indicating the termination of the session. The VoIP GW 502 receives the BYE message and transmits a 200 OK message, and the CPU 302 disconnects the call.

The processing of the partner-side apparatus will be described below with reference to a flowchart 200 shown in FIG. 2.

The partner-side apparatus determines in step S202 whether or not an incoming FAX call is detected. If no incoming call is detected, since the partner-side apparatus does not answer, it returns to a standby state of step S202. On the other hand, if an incoming FAX call is detected, the partner-side apparatus advances to step S203 to answer. In step S203, the partner-side apparatus executes FAX reception. Subsequently, in step S204, the partner-side apparatus prints or stores image data upon completion of transmission from the user, and then executes termination processing. A FAX communication unit of the partner-side apparatus returns to a standby state, thus ending the series of processes.

The description will revert to that of the flowchart shown in FIGS. 1A and 1B. The processing of step S109 when the user instructs "transmission after calling" on the screen 702, 706, or 710 via the UI 314 in step S103 will be described below. In this case, since the partner's e-mail address=xx@xx.com is registered, the CPU 302 executes transmission to the corresponding e-mail address. The CPU 302 transmits an e-mail message to the mail server 515 via the network I/F control unit 319 using a communication method which matches SMTP. It is a common practice to read documents set on the scanner 318 in a designated mode, and to attach image data of a JPG, TIFF, or PDF format. In this case, image data for each page may be transmitted while reading the documents page by page. Alternatively, all the documents may be read once to store image data in the HDD 306, and the stored image data may be transmitted. Alternatively, immediately after the user selects "transmission after calling", all the documents may be read in advance to store image data in the HDD 306, and the stored image data may be transmitted. That is, the documents may be read by the scanner 318 at an arbitrary timing. Then, the CPU 302 advances to the process of step S110.

The processing of the partner-side apparatus will be described below with reference to a flowchart 220 shown in FIG. 2. In this case, the PC 517 serves as an e-mail communication unit. The PC 517 determines in step S402 whether or not an e-mail acquisition condition is matched. In general, since the e-mail acquisition condition is matched when e-mail software executes a reception operation at a pre-set time interval or the partner-side apparatus executes the reception operation of the e-mail software, the PC 517 advances to the process of step S403. If the e-mail acquisition condition is not matched, the process returns to a standby state of step S402.

In step S403, the PC 517 receives an e-mail message. The e-mail message is received using a communication method which matches a POP format from the PC 517 to the main server 515. Upon completion of reception from the mail server 515, the PC 517 executes termination processing in step S404. The PC 517 can refer to JPG, TIFF, or PDF image data attached to the e-mail message. The e-mail communication unit returns to a standby state, thus ending the series of processes.

The description will revert to that of the flowchart shown in FIGS. 1A and 1B. The processing of step S109 when the user instructs "transmission after calling" on the screen 704 via the UI 314 in step S103 will be described below. In this case, since "file transmission=¥¥172.168.0.1¥smb" is registered as the file transmission destination, the CPU 302 accesses a corresponding shared folder. The CPU 302 transmits and writes image data in a shared folder set in the PC 516 by a method which matches SMB or the like via the network I/F control unit 319. When an ID and password are required to access the shared folder, these ID and password are set on the destination registration screen and are used or they are set on the UI 314 every time they are used. It is a common practice to read documents set on the scanner 318 in a designated mode, and to write image data of the JPG, TIFF, or PDF format. In this case, image data may be transmitted for each page while reading the documents page by page. Alternatively, all the documents may be read once to store image data in the HDD 306, and the stored image data may be transmitted. Alternatively, immediately after the user selects "transmission after calling", all the documents may be read in advance to store image data in the HDD 306, and the stored image data may be transmitted. Then, the CPU 302 advances to the process of step S110.

The processing of the partner-side apparatus will be described below with reference to a flowchart 230 shown in FIG. 2. In this case, the PC 516 serves as a file sharing unit. The PC 516 determines in step S502 whether or not a shared file access condition is matched. In general, since the shared file access condition is matched when the image processing apparatus 301 accesses the shared folder of the PC 516, the PC 516 advances to the process of step S503. If the shared file access condition is not matched, the process returns to a standby state of step S502. In step S503, the PC 516 writes image data transmitted from the image processing apparatus 301 by accessing the shared folder. Subsequently, the PC 516 executes shared folder access termination processing in step S504. By accessing the shared folder of the PC 516, JPG, TIFF, or PDF image data can be referred to. After that, the PC 516 returns to a standby state, thus ending the series of processes.

The description will revert to that of the flowchart shown in FIGS. 1A and 1B. When the user instructs a plurality of transmission destinations on the screen 710 via the UI 314 in step S103, the aforementioned transmission processes are executed at the same time in step S109. The transmission processes are executed sequentially if they cannot be executed at the same time. After that, the CPU 302 advances to the process of step S110.

The CPU 302 determines in step S110 whether or not a voice call termination instruction is input. After completion of transmission from the image processing apparatus 301 to the transmission destination, the user inputs a voice call termination instruction using the headset 309 or slave phone 328 used in a voice call or the UI 314. Upon detection of the voice call termination instruction, the CPU 302 advances to the termination processing of step S111. Also, when a predetermined period of time, which is set in advance, has elapsed, or when a user instruction cannot be detected within a predetermined period of time, which is set in advance, the CPU 302 may determine detection of a voice call termination instruction, and the process may advance to step S111. If the CPU 302 cannot detect any voice call termination instruction, the process returns to step S110.

If the CPU 302 determines in step S106 that "transmission after calling" is not selected, the process advances to step S113, and the CPU 302 determines whether or not "transmission" is selected. If the user instructs "transmission" on the UI 314, the CPU 302 advances to the process of step S114. On the other hand, if the user does not instruct "transmission" on the UI 314, the CPU 302 advances to the process of step S115.

In step S114, the CPU 302 executes transmission to the selected transmission destination using an internal transmission unit of the MFP. When the user instructs "transmission" on one of the screens 701 to 704, 706, 707, 709, 710, and 713 via the UI 314 in step S103, the CPU 302 executes transmission to the registered transmission destination. Since this transmission processing has the same processing content as that described in step S109, a description thereof will not be repeated. Upon completion of the transmission processing in step S114, the CPU 302 advances to the process of step S111.

On the other hand, if the CPU 302 determines in step S113 that "transmission" is not selected, the process advances to step S115, and the CPU 302 determines whether or not "calling" is selected. If the user instructs "calling" on the UI 314, the CPU 302 advances to the process of step S116. If the user does not instruct "calling" on the UI 314, since none of "transmission after calling", "transmission", and "calling" are selected, the CPU 302 advances to the process of step S111 so as to execute another processing or error processing.

In step S116, the CPU 302 makes a voice call operation to the selected voice call destination name using an internal phone unit of the MFP. When the user instructs "calling" on one of the screens 701 to 704, 706, 708, 710, and 712 via the UI 314 in step S103, the CPU 302 makes a voice call operation to the registered voice call destination. Since this voice call processing has the same processing content as that described in step S107, a description thereof will not be repeated. Upon completion of the voice call processing of step S116, the CPU 302 advances to the process of step S111.

In step S111, the CPU 302 executes termination processing. The CPU 302 terminates and initializes the functions used in the aforementioned operations and communications, and stores a log of the aforementioned operations and communication results in the HDD 306. Then, the process advances to step S117. Although not shown in the flowchart, when a communication stop instruction is input on the UI 314 in the middle of the processing or when a function operation error has occurred during an operation and the instructed operation can no longer be continued, the process advances to step S111 so as to execute communication termination processing.

As described above, the image processing apparatus according to this embodiment provides various communication methods. When two or more communication methods are continuously used for one user, the image processing apparatus prompts the user to select whether different communication methods are to be continuously used or a sole communication method is to be used using destinations, which are set in advance. That is, when different communication methods are to be continuously used, the user need only select whether to input an instruction for continuously using different communication methods or an instruction using a sole communication method using destinations, which are set in advance. According to the image processing apparatus of this embodiment, when the user inputs the instruction for continuously using different communication methods, a communication using a first communication method is executed, and upon detection of termination of the communication, a communication using a second communication method is executed to a pre-set destination. That is, the user need not set a destination in the communication using the second communication method after termination of the communication using the first communication method.

Second Embodiment

The second embodiment of the present invention will be described below. The processing sequence when group registration is made upon destination registration will be described below with reference to FIGS. 1A and 1B. The processing to be described below is implemented when a CPU 302 reads out a control program stored in a ROM 304 or HDD 306 onto a RAM 305, and executes the readout program. Note that only processes different from the first embodiment will be mainly explained below.

In step S102, the user registers a plurality of voice call destination names and transmission destination names from a UI 314 in a phone book of an image processing apparatus 301 in association with each other. Settings for registering a plurality of destinations as a group using a screen 609, simultaneously applying the same processing to the group, and sequentially executing transmission after calling to the plurality of destinations will be described below. In this case, the user instructs to display "destination No.=04" on the UI 314. The user sets a branch group in a destination name. The user instructs to display items of a group destination on the UI 314, and changes to "group destination=○". Destination Nos. 05, 06, and 07 have already been registered, and Internet phone destinations of partners with whom the user wants to make voice calls and their FAX numbers have already been set.

For example, at the time of registration, the user registers "Internet phone destination name=x505" and "FAX number=03-0005-0000" of the destination No. 05. Likewise, the user registers "Internet phone destination name=x506" and "FAX number=03-0006-0000" of the destination No. 06. The user registers "Internet phone destination name=x507**" and "FAX number=03-0007-0000" of the destination No. 07. Assume that the partners of Nos. 05, 06, and 07 are connected to an IP network 501 or PSTN. "FAX communication unit is set to T.38" for the settings of all the destination Nos. Other fields may be blank.

Then, in the setting of "the destination No.=04", the user instructs to display a group breakdown item on the UI 314, and registers the destination Nos. 05, 06, and 07. Upon completion of input of the settings required to sequentially execute transmission after calling for the plurality of destinations, the screen 609 is displayed on the UI 314. Since the destination registration in the phone book is complete, the process of the CPU 302 advances to step S103.

The CPU 302 determines in step S103 whether or not the user makes destination selection and inputs an operation instruction on the UI. When the user sets in step S102 that FAX transmission is executed after voice call with a plurality of partners, as shown in the screen 609, a screen 711 is displayed on the UI 314. The user sets documents to be transmitted on the image processing apparatus 301, selects a transmission menu from the UI 314, and selects the grouped destination No. 04. When the user wants to execute transmission after calling after he or she confirms if the group breakdown is correct, the user instructs "transmission after calling" on the UI 314. On the other hand, when the user wants to make a voice call alone, he or she instructs "calling" on the UI 314. When the user wants to execute transmission alone, he or she instructs "transmission" on the UI 314. If a plurality of voice call destinations and transmission destinations are registered in the destination No. included in the group breakdown, as shown in a screen 608, a screen 705 is displayed on the UI 314, and the user individually selects a voice call destination and transmission destination. The user makes the aforementioned selection according to the registered content of the group breakdown. If there are items which fall outside the screen of the UI 314, they can be displayed by scrolling the screen. Upon detection of the destination selection and operation instruction on the UI 314, the CPU 302 advances the process to step S104.

The CPU 302 determines in step S104 whether or not the user has made the executable destination selection and operation instruction. When the user inputs one of the operation instructions "transmission after calling", "transmission", and "calling" in step S103, if that instruction cannot be executed at one destination No., the processing for the destination No. is skipped, and the control advances to the processing of the next destination No. Then, by executing termination processing of step S111, the result is displayed on the UI 314, and is stored in a log. More specifically, if only a FAX transmission destination is registered in the destination No. 05 of the destination Nos. 05, 06, and 07 of the group breakdown, since the transmission after calling instruction cannot be executed by the destination No. 05, the process advances to step S105. If the operation instruction can be executed, the process of the CPU 302 advances to step S106.

In step S111, the CPU 302 sequentially executes the processes of steps S104 to S111 in turn for each destination No. of the registered group breakdown, and determines whether or not the processing for all the destination Nos. is complete. Then, the CPU 302 displays the result on the UI 314, and stores it in a log, thus executing termination processing. Then, the CPU 302 advances the process to step S117, and returns to a standby state.

As described above, when the user selects a group-registered destination including a plurality of destinations, and instructs "transmission after calling" or the like, if there is a function which cannot be executed by the apparatus of a given destination, the image processing apparatus according to this embodiment skips processing for that destination. Thus, even when group registration is made, transmission after calling can be suitably implemented like in the first embodiment.

Third Embodiment

The third embodiment will be described below. The hardware arrangement of an image processing apparatus 401 and network connections according to this embodiment will be described below with reference to FIG. 4. In this embodiment, differences from FIG. 3 will be mainly described. Note that this embodiment can be practiced in combination with at least one of the first and second embodiments.

Figure 4:
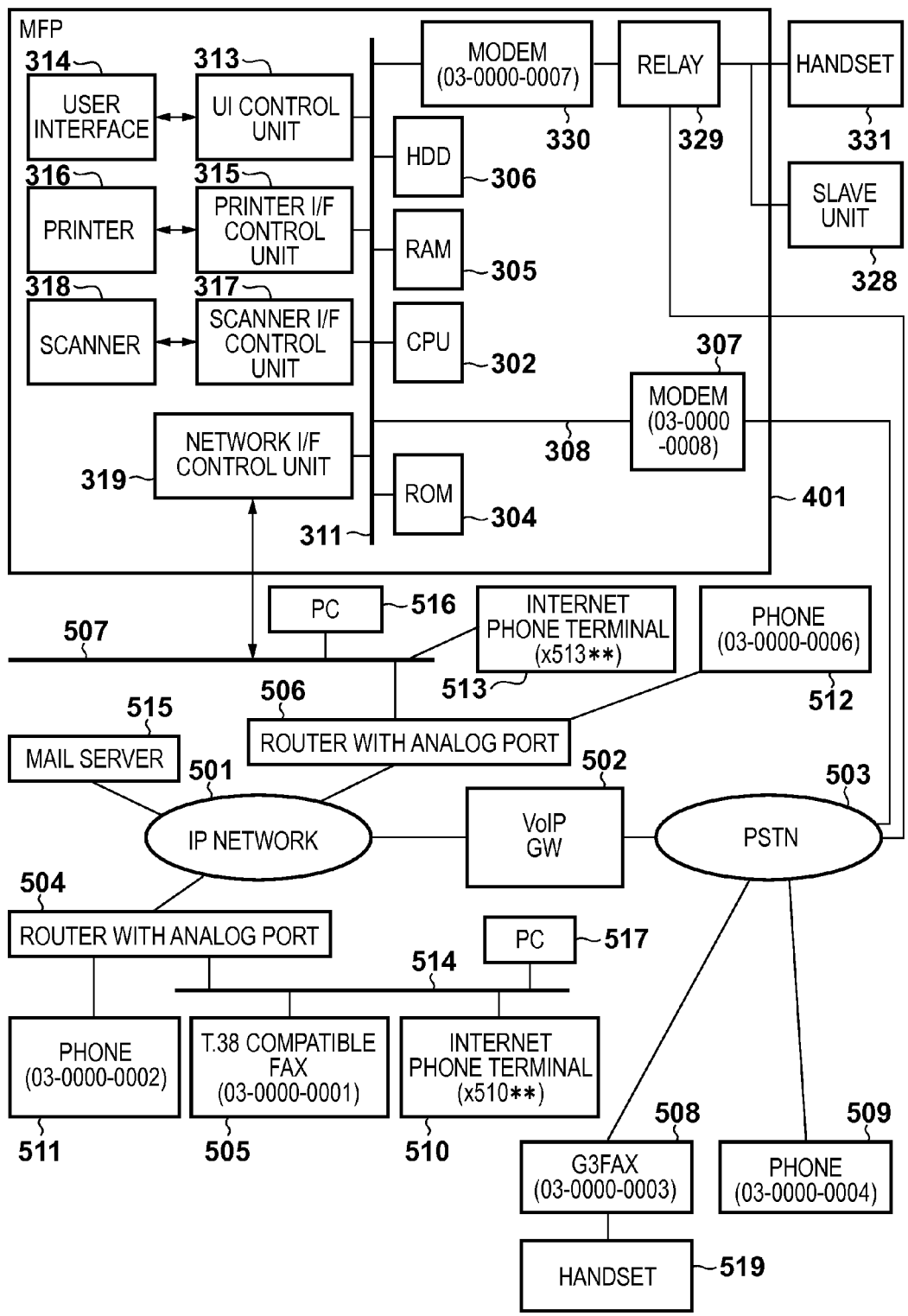
FIG. 4 is a block diagram showing the arrangement of an image processing apparatus and network connections according to the third embodiment.

In an image processing apparatus 401 shown in FIG. 4, the CODEC 320, bus 321, voice circuit 322, SLIC 327, analog signal 312, and headset 309 are deleted since they are not necessary. Instead, to the image processing apparatus 401, a modem 330, relay 329, and handset 331 are added. These added blocks are connected in the image processing apparatus 401 via appropriate signals, and are controlled by a CPU 302. The image processing apparatus 401 includes two lines of G3 FAX communication functions connected to a PSTN, and the handset 331 and a slave phone 328 are connected to one G3 FAX to allow voice calls. The image processing apparatus 401 can switch, using the relay 329, whether a communication is made via the modem 330 or a voice call is made via the handset 331 or slave phone 328. The modem 330 and a modem 307 are connected to the PSTN 503, and allow G3 FAX communications and voice calls via the PSTN. Since other portions have the same structure as that of the image processing apparatus 301 shown in FIG. 3, a description thereof will not be repeated.

The processing sequence of this embodiment will be described below with reference to FIGS. 1A and 1B. The important sequence in the present invention will be described using FIGS. 1A and 1B. The processing to be described below is implemented when the CPU 302 reads out a control program stored in a ROM 304 or HDD 306 onto a RAM 305, and executes the readout program. Note that differences from the first embodiment will be mainly described below. In step S102, destinations are registered in a phone book. In this embodiment, settings for executing FAX transmission after a voice call via the handset 331 or slave phone 328 using a screen 610 will be described below. On the screen 610 for destination registration, the CPU 302 may hide, in UI 314, destinations associated with functions which are not available at this time so as not to select these functions.

In this case, "branch 1" is set as a destination name. The user sets a phone number "03-0000-0004" of a voice call partner. The user sets a FAX number "03-0000-0003" of a transmission partner. In this embodiment, the image processing apparatus 401 does not include any T.38 communication unit. The user sets "T.30" in the communication unit field. Alternatively, when the user leaves it blank, "T.30" is automatically selected. Upon completion of input of the settings for executing T.30 FAX transmission after a voice call via the handset 331 or slave phone 328, the process of the CPU 302 advances to step S103.

The CPU 302 determines in step S103 whether or not the user has made destination selection and has input an operation instruction on a UI. If the user sets in step S102 that G3 FAX transmission is executed after a voice call via a phone, as shown in the screen 610, a screen 715 is displayed on the UI 314. After the user confirms if the voice call destination and FAX transmission destination are correct, he or she instructs "transmission after calling" on the UI 314. When the user inputs a use instruction by off-hooking the handset 331 or inputs a voice call instruction from the handset 331 on the UI 314, the handset 331 is used in a voice call in subsequent step S107. When the user inputs a use instruction by off-hooking the slave phone 328 or inputs a voice call instruction from the slave phone 328 on the UI 314, the slave phone is used in a voice call in subsequent step S107. Then, since the CPU 302 detects the destination selection and operation instruction on the UI 314, the process of the CPU 302 advances to step S104. That is, a subsequent voice call method is switched by an operation instruction method by the user.

The CPU 302 determines in step S104 whether or not the user has made the executable destination selection and operation instruction on the UI 314. If one of the modems 330 and 307, handset 331, and slave phone 328 is busy, since "transmission after calling" cannot be executed, the process of the CPU 302 advances to step S105. If either of the handset 331 and slave phone 328 is off-hooked to input a voice call instruction, the relay 329 is switched immediately after the modem 330 is controlled to a DC capturing state, and the modem 330 then forms a DC loop from the PSTN. Then, the modem 330 detects a dial tone to determine whether the handset 331 or slave phone 328 is busy or is merely used to input a voice call instruction of "transmission after calling". If the handset 331 or slave phone 328 is busy, since "transmission after calling" cannot be executed, the relay 329 is re-connected to the handset 331 or slave phone 328 side, and the process of the CPU 302 then advances to step S105. That is, the transmission after calling processing is interrupted. In this manner, the CPU 302 determines whether or not an executable instruction is input.

In step S107, the CPU 302 executes a voice call operation for the selected voice call destination using an internal voice call unit of an MFP. A case will be described below wherein the user instructs "transmission after calling" on the screen 715 via the UI 314 in step S103. In this case, since "TEL 03-0000-0004" is registered, the CPU 302 makes a voice call operation for that phone number. When the user inputs a use instruction by off-hooking the handset 331 or inputs a voice call instruction from the handset 331 on the UI 314, the handset is used in a voice call. The CPU 302 switches the relay to the modem 330 side, and after the modem 330 captures a DC current, it outputs DTMF tones onto the PSTN, thus originating a call to the partner's phone number (03-0000-0004). Alternatively, a dial pulse generation circuit generates pulses to originate a call to the partner's phone number. After that, the CPU 302 switches the relay to the handset 331 side, and the user makes a voice call with the partner using the handset 331. When the user inputs a use instruction by off-hooking the slave phone 328 or inputs a voice call instruction from the slave phone 328 on the UI 314, the CPU 302 switches the relay to the modem 330 side. Then, under the control of the CPU 302, after the modem 330 captures a DC current, it outputs DTMF tones onto the PSTN, thus originating a call to the partner's phone number (03-0000-0004). Alternatively, a dial pulse generation circuit generates pulses to originate a call to the partner's phone number (03-0000-0004). When the user has not input a use instruction of the handset 331 or slave phone 328 yet after he or she instructed "transmission after calling", the CPU 302 displays a message "off-hook handset or slave phone" on the UI 314. When the user has input a use instruction of the handset 331 or slave phone 328 before he or she instructs "transmission after calling", the CPU 302 does not display the above message. Which of the handset 331 and slave phone 328 is to be used can be distinguished using a photocoupler in the image processing apparatus 401. Then, the CPU 302 advances to the process of step S108.

In step S109, the CPU 302 executes transmission to the selected transmission destination using an internal FAX transmission unit of the MFP. A case will be explained below wherein the user instructs "transmission after calling" on the screen 715 via the UI 314 in step S103. In this case, since "FAX=03-0000-0003 and "communication method=T.30" are registered, the CPU 302 executes transmission to the corresponding FAX number. After the modem 307 captures a DC current, it outputs DTMF tones onto the PSTN, thus originating a call to the partner's FAX number (03-0000-0003). Alternatively, a dial pulse generation circuit generates pulses to originate a call to the partner's FAX number.

When a receiving apparatus answers a call, the CPU 302 transmits image data obtained by reading documents set on a scanner 318 in a designated mode by a communication method which matches T.30. In this case, the CPU 302 may execute direct transmission for executing FAX transmission while reading documents. Alternatively, immediately after the user selects "transmission after calling", the CPU 302 may read all documents in advance, may store image data in the HDD 306, and may execute memory transmission using the stored image data upon execution of FAX transmission. If the voice call destination registered in "transmission after calling" matches the FAX number, since the partner may be possible to simultaneously receive a FAX call and voice call by the same phone number owing to an NGN multi-session contract, the processing is continued without generating any error. After transmission, the CPU 302 advances to the process of step S110.

In the above description, a destination is instructed using a phone number based on the numbering plan of the NGN contract in T.38 and T.30 VoIP communications. Alternatively, a destination may be instructed using an IP (Internet Protocol) address, URL (Uniform Resource Locator), SIP (Session Initiation Protocol) URI (Uniform Resource Indicator), appended port number, ID, password, and the like.

As described above, when the user wants to execute FAX transmission after a voice call with the partner, if the receiving side introduces a new infrastructure, voice call numbers, FAX numbers, and communication units do not often match. Even in such case, a convenient image processing apparatus, which can reduce the number of times of partner selection to one, and can skip operations while reducing a transmission error possibility can be provided.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-276119 filed on Dec. 18, 2012, which is hereby incorporated by reference herein in its entirety.

What is claimed is:

1. An image processing apparatus capable of executing a voice call and a data transmission, comprising:
   a reading unit configured to read a document and generate image data of the document;
   a registration unit configured to register, for one destination, voice call destination information used to execute the voice call and data transmission destination information used to execute the data transmission;
   a selecting unit configured to select a communication mode including at least a voice call mode, a transmission mode, and a transmission after calling mode in accordance with an operation by a user; and
   a control unit configured to execute, based on a selection of the transmission after calling mode, a voice call with the destination using the voice call destination information registered for the destination, and then cause, based on a user instruction input by a user, the reading unit to read the document, and then execute data transmission of the image data of the document to the destination using the data transmission destination information registered by the registration unit.

2. The apparatus according to claim 1, further comprising a display control unit is configured to identifiably display a function which is executable for the destination in accordance with a content registered by the registration unit.

3. The apparatus according to claim 2, wherein the registration unit is configured to register a plurality of items of voice call destination information in association with a plurality of items of data transmission destination information for the one destination, and
   the display control unit is configured to display any of the plurality of items of voice call destination information and the plurality of items of data transmission destination information to be selectable.

4. The apparatus according to claim 2, wherein the display control unit is configured to gray out a button used to instruct a function which cannot be executed, and
   when the grayed-out button is selected, the control unit is configured to display a warning indicating that the function cannot be to executed.

5. The apparatus according to claim 1, further comprising a handset and a slave unit which serve as a user interface,
   wherein the voice call corresponds to a public line phone,
   the data transmission corresponds to G3 facsimile transmission,
   the control unit comprises a detection unit configured to detect a dial tone using a modem in the case where the transmission after calling mode is selected by the selecting unit and the handset or the slave unit is off-hooked,
   in a case where the detection unit fails to detect the dial tone, the control unit is configured to determine that the handset or the slave unit is busy, and interrupts processing by the transmission after calling mode, and
   when the detection unit detects the dial tone, the control unit executes processing by the transmission after calling mode.

6. The apparatus according to claim 1, wherein the voice call corresponds to one of an Internet phone, a public line phone, and an Internet Protocol phone.

7. The apparatus according to claim 1, wherein the data transmission corresponds to one of G3 facsimile transmission, T.38 compatible facsimile transmission using an Internet Protocol, e-mail transmission, and transmission to a shared folder.

8. The apparatus according to claim 1, wherein the voice call destination information includes one of a string including characters or numerals indicating an Internet phone destination name, a phone number, an Internet Protocol address, a URL (Uniform Resource Locator), and an SIP (Session Initiation Protocol) URI (Uniform Resource Indicator).

9. The apparatus according to claim 1, wherein the data transmission destination information includes one of a phone number, an Internet Protocol address, an e-mail address, a URL (Uniform Resource Locator), an SIP (Session Initiation Protocol) URI (Uniform Resource Indicator), and a string including characters and numerals indicating a path name to a shared folder.

10. A control method of an image processing apparatus capable of executing a voice call and data transmission, the method comprising:
    reading, by a reading unit, a document and generating image data of the document;
    registering, for one destination, voice call destination information used to execute the voice call and data transmission destination information used to execute the data transmission;
    selecting a communication mode including at least a voice call mode, a transmission mode, and a transmission after calling mode in accordance with an operation by a user; and
    executing, based on a selection of the transmission after calling mode, a voice call with the destination using the voice call destination information registered for the destination, and then causing, based on a user instruction input by a user, the reading unit to read the document, and then execute data transmission of the image data of the document to the destination using the registered data transmission destination information.

11. A non-transitory computer-readable storage medium storing a computer program for causing a computer to execute a method of controlling an image processing apparatus, the method for controlling comprising:
    reading, by a reading unit, a document and generate image data of the document;
    registering, for one destination, voice call destination information used to execute the voice call and data transmission destination information used to execute the data transmission;
    selecting a communication mode including at least a voice call mode, a transmission mode, and a transmission after calling mode in accordance with an operation by a user; and
    executing, based on a selection of the transmission after calling mode, a voice call with the destination using the voice call destination information registered for the destination, and then causing, based on a user instruction input by a user, the reading unit to read the document, and then execute data transmission of the image data of the document with the destination using the registered data transmission destination information.

* * * * *